US012526338B1

(12) United States Patent
Diaz et al.

(10) Patent No.: US 12,526,338 B1
(45) Date of Patent: *Jan. 13, 2026

(54) SMART PLATFORM FOR PROGRAMMING KEYLESS REMOTE DEVICES

(71) Applicant: Novo Blue Technologies, LLC, Tampa, FL (US)

(72) Inventors: Nils J. Diaz, Tampa, FL (US); Jorge A. Rodriguez, III, Telluride, CO (US)

(73) Assignee: Novo Blue Technologies, LLC, Tampa, FL (US)

( * ) Notice: Subject to any disclaimer, the term of this patent is extended or adjusted under 35 U.S.C. 154(b) by 140 days.

This patent is subject to a terminal disclaimer.

(21) Appl. No.: 18/522,790

(22) Filed: Nov. 29, 2023

Related U.S. Application Data

(63) Continuation of application No. 17/712,779, filed on Apr. 4, 2022, now Pat. No. 11,870,851, which is a continuation of application No. 16/142,740, filed on Sep. 26, 2018, now Pat. No. 11,316,927.

(60) Provisional application No. 62/698,391, filed on Jul. 16, 2018.

(51) Int. Cl.
| | |
|---|---|
| *H04L 67/125* | (2022.01) |
| *B60R 25/24* | (2013.01) |
| *G06Q 20/40* | (2012.01) |
| *G07C 9/00* | (2020.01) |
| *G07C 9/29* | (2020.01) |
| *G08C 17/02* | (2006.01) |
| *H04M 1/72412* | (2021.01) |
| *H04W 4/44* | (2018.01) |
| *G06F 3/0484* | (2022.01) |
| *H04W 4/029* | (2018.01) |

(52) U.S. Cl.
CPC ............ *H04L 67/125* (2013.01); *B60R 25/24* (2013.01); *G06Q 20/4014* (2013.01); *G07C 9/00309* (2013.01); *G07C 9/29* (2020.01); *G08C 17/02* (2013.01); *H04M 1/72412* (2021.01); *H04W 4/44* (2018.02); *G06F 3/0484* (2013.01); *G07C 2009/00547* (2013.01); *G08C 2201/21* (2013.01); *H04W 4/029* (2018.02)

(58) Field of Classification Search
CPC ...... H04W 4/44; G07C 9/29; H04M 1/72412; B60R 25/24; G08C 17/02
USPC ..................................................... 340/539.13
See application file for complete search history.

(56) References Cited

U.S. PATENT DOCUMENTS

| | | | | |
|---|---|---|---|---|
| 7,315,238 | B2 * | 1/2008 | Chambers | .......... G07C 9/00857 340/426.14 |
| 8,841,987 | B1 * | 9/2014 | Stanfield | ............... B60R 25/241 340/5.61 |
| 9,171,456 | B2 * | 10/2015 | Ramchandani | .... G07C 9/00309 |

(Continued)

*Primary Examiner* — Jack K Wang
(74) *Attorney, Agent, or Firm* — Trenam Law

(57) ABSTRACT

A system and method for programming a new key fob. Some embodiments include a programmable remote transmitter, designed, and programmed to perform single or multiple operations, optionally incorporated into a custom-made base that attaches to a smart phone case or other mobile devices. The remote transmitter is designed and activated via secured programming provided by an application on the user's mobile device, without the intervention of car dealers, locksmiths or using difficult manual processes. The remote transmitter can be attached to smart phones, mobile devices, or other suitable surfaces (e.g., a briefcase or a vehicle's dashboard) for safekeeping and accessibility.

20 Claims, 11 Drawing Sheets

(56) References Cited

U.S. PATENT DOCUMENTS

| | | | |
|---|---|---|---|
| 10,339,739 B2* | 7/2019 | Mala | G07C 9/00857 |
| 2014/0266582 A1* | 9/2014 | Lopez | B60R 25/00 |
| | | | 340/5.25 |
| 2014/0268472 A1* | 9/2014 | Easter | H01F 13/006 |
| | | | 361/149 |
| 2014/0277837 A1* | 9/2014 | Hatton | H04L 63/0853 |
| | | | 701/2 |
| 2017/0349142 A1* | 12/2017 | Krishnan | B60R 25/24 |
| 2018/0045159 A1* | 2/2018 | Patel | F02N 11/0807 |
| 2018/0091930 A1* | 3/2018 | Jefferies | G07C 9/00571 |
| 2018/0210747 A1* | 7/2018 | Smith | G06F 9/45558 |
| 2021/0037099 A1* | 2/2021 | Diaz | G07C 9/00857 |

* cited by examiner

SMART PLATFORM FOR PROGRAMMING KEYLESS REMOTE DEVICES

CROSS-REFERENCE TO RELATED APPLICATIONS

This nonprovisional application is a continuation of and claims priority to nonprovisional application Ser. No. 17/712,779, entitled "Smart Platform for Programming Keyless Remote Devices," filed Apr. 4, 2022, by the same inventor(s), which is a continuation of and claims priority to nonprovisional application Ser. No. 16/142,740, entitled "Smart Platform for Programming Keyless Remote Devices," filed Sep. 26, 2018, by the same inventor(s), which claims priority to provisional patent application, Ser. No. 62/698,391 entitled "Attachable Case Technology," filed Jul. 16, 2018, by the same inventor(s), which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71 (d).

FIELD OF THE INVENTION

At least some embodiments disclosed herein relate, in general, to programmable remote keyless devices and more specifically to smart platforms for programmable remote keyless devices.

BRIEF SUMMARY OF THE INVENTION

The present disclosure is directed to a platform that provides a user programmable remote transmitter, designed and programmed to perform single or multiple operations, for example, locking and unlocking an automobile, and starting an automobile. The remote transmitter can be used independently or incorporated into a custom-made base that attaches to a cell phone case or other devices, referred to herein as an Attachable Remote Key or ARK.

In an embodiment, there are two distinctive features of the technology: the remote transmitter within the ARK is designed and activated via secured programming without the intervention of car dealers, locksmiths, or difficult and complicated processes; and, optionally, the case of the ARK can be attached to smart phones, other mobile devices, or other suitable surfaces (e.g., a briefcase or a vehicle's dashboard) for safekeeping and accessibility.

Some embodiments of the present invention include a platform for programming a new vehicle fob. The new vehicle fob is configured to wirelessly transmit commands to an onboard computer of a vehicle once an onboard computer's fob interface has been reprogrammed and wirelessly communicate with a user's computing device. The platform may further include at least one remote server hosting a service adapted to communicate with the user's computing device. The service is adapted to receive user information from the computing device of the user; receive vehicle information; and transmit programming instructions to the user's computing device for reprogramming the onboard computer's fob interface to recognize the new vehicle fob.

Some embodiments further include an application comprising computer executable instructions that when installed on the computing device, enables the computing device to receive user information from the user; receive the vehicle information; transmit the user information to the service; receive the programming instructions for reprogramming the onboard computer's fob interface to recognize the new vehicle fob; and transmit the programming instructions to the new vehicle fob and to the onboard computer's fob interface of the vehicle such that the onboard computer's fob interface is reprogrammed to recognize the new vehicle fob and respond to the commands from the new vehicle fob.

In some embodiments, the commands from the new vehicle fob comprise at least one of the commands to open the vehicle, lock the vehicle, start the vehicle, and open a trunk of the vehicle. In some embodiments, the application further enables the computing device to enable the user of the computing device to cause the new vehicle fob to transmit at least one of the commands to the onboard computer of the vehicle using a graphic user interface provided by the application on the computing device.

In some embodiments, the user's computing device is configured to wirelessly connect to a wireless interface of the vehicle and automatically retrieve vehicle information. The vehicle information may include a make and model of the vehicle.

In some embodiments, the application further enables the computing device to retrieve and display a location of the new vehicle fob on a graphic user interface on the computing device.

In some embodiments, the new vehicle fob has at least one button that, when pressed, causes the new vehicle fob to transmit one of the commands to the onboard computer of the vehicle.

In some embodiments, the user's computing device is further adapted to instruct the vehicle fob interface to delete any pre-existing key fobs from the onboard computer of the vehicle.

In some embodiments, the new vehicle fob is associated with the user's computing device such that the new vehicle fob will not respond to commands issued by other applications on other user devices unless the new vehicle key fob is factory reset or reconfigured.

Some embodiments of the present invention include a method for programming a new vehicle fob. The method includes receiving the new vehicle fob, wherein the new vehicle fob is adapted to wirelessly transmit commands to an onboard computer of a vehicle once an onboard computer's fob interface has been reprogrammed and wirelessly communicate with a user's computing device.

The method further includes transmitting, from the user's computing device to at least one remote server, user identification information and vehicle identification information. In response to receiving user identification information and vehicle identification information, the method further includes transmitting to the user's computing device programming instructions for deleting any pre-existing key fobs from the onboard computer of the vehicle and reprogramming the onboard computer's fob interface to recognize the new vehicle fob. Then, the programming instructions are transmitted to the new vehicle fob and to the onboard computer's fob interface of the vehicle such that the onboard computer's fob interface is reprogrammed to delete any programming corresponding to pre-existing key fobs and recognize the new vehicle fob and respond to the commands from the new vehicle fob.

In some embodiments of the method, the commands from the new vehicle fob comprise at least one of, but not limited to open the vehicle, lock the vehicle, start the vehicle, and open a trunk of the vehicle.

In some embodiments of the method, the computing device is configured to transmit at least one of the commands to the onboard computer of the vehicle using a user interface provided by the application on the computing device.

Some embodiments of the method further include the user's computing device wirelessly connecting to a wireless interface of the vehicle and automatically retrieving a make and model of the vehicle.

In some embodiments of the method, the computing device is configured to retrieve and display a location of the new vehicle fob on a user interface on the computing device.

In some embodiments of the method, the new vehicle fob has at least one button that, when pressed, causes the new vehicle fob to transmit one of the commands to the onboard computer of the vehicle.

In some embodiments of the method, the new vehicle fob is associated with the user's computing device such that the new vehicle fob will not respond to commands issued by other applications on other user devices unless the new vehicle key fob is factory reset or reconfigured.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
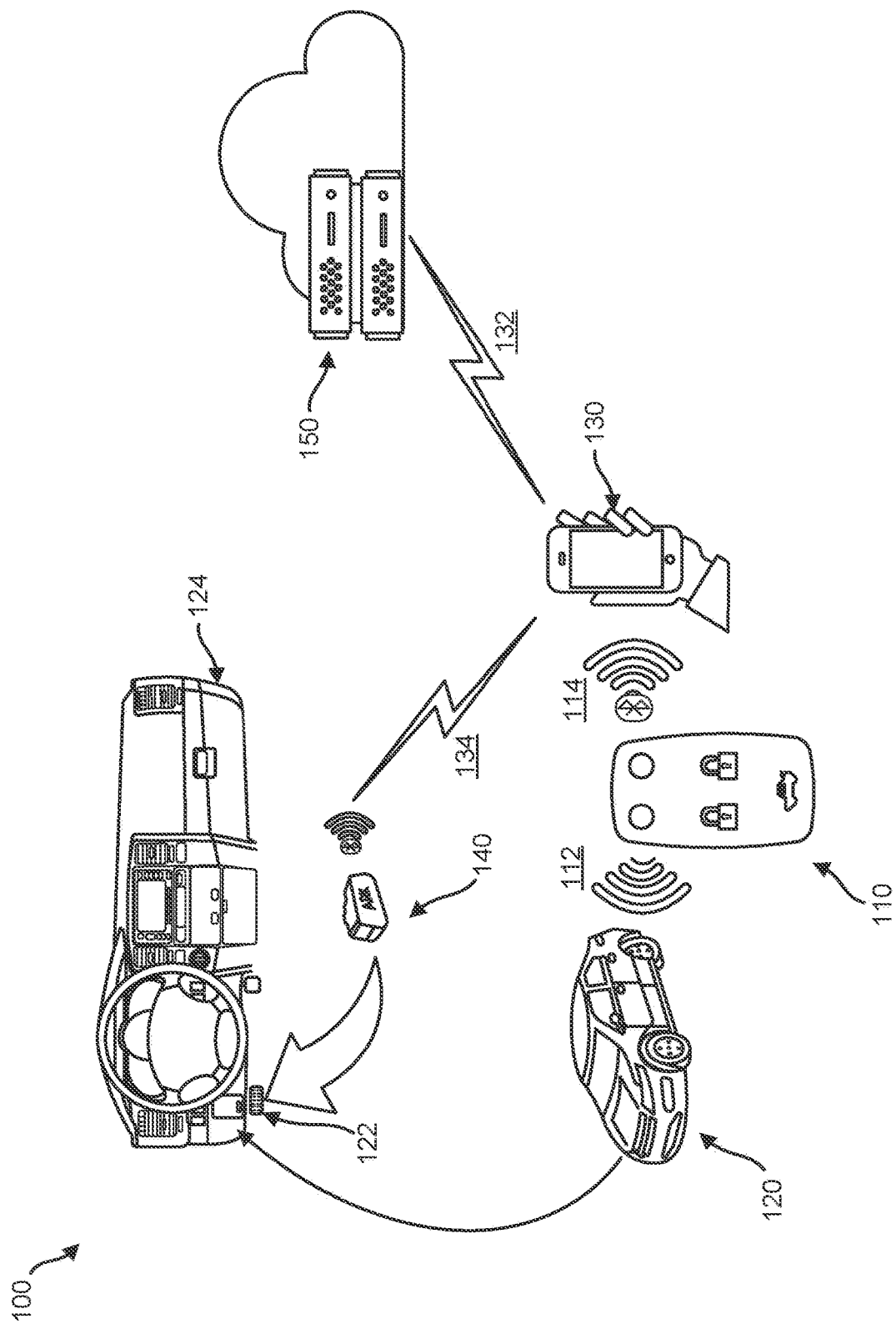
FIG. 1 shows an overview of an embodiment of a platform for a user programmable attachable remote key (ARK) in accordance with present disclosure.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention is described below with reference to block diagrams and operational illustrations of methods and devices for smart platforms for programmable remote keyless devices. It is understood that each block of the block diagrams or operational illustrations, and combinations of blocks in the block diagrams or operational illustrations, can be implemented by means of analogue or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, the term "server" or "computing device" should be understood to refer to a service point which provides processing, database, and/or communication facilities. By way of example, and not limitation, the term "server" or "computing device" can refer to a single, physical processor with associated communications and data storage and/or database facilities, or it can refer to a networked or clustered complex of processors and associated network and storage devices, as well as operating software and one or more database systems and applications software which support the services provided by the server.

In various embodiments, servers and/or computing devices may be provided as virtual servers and computing devices, which may be provided by a cloud-based platform, such as, for example, the Google Cloud® platform or the IBM Cloud® platform. In various embodiments, databases may be hosted on cloud-based data storage which may be provided by a cloud-based platform, such as, for example, the Google Cloud® platform or the IBM Cloud® platform.

In various embodiments, servers or computing devices may be capable of receiving, capturing, and transmitting audio and/or video data.

For the purposes of this disclosure, the term "mobile device" should be understood to refer to any kind of computing device that is designed to be easily carried by a user to any location of the user's choosing. Examples of a mobile device include a smart phone, a cell phone, a tablet computer, and a laptop computer. Mobile devices commonly include wireless communications capabilities such as, for example, cellular communications capabilities, or Wi-Fi, and may be additionally capable of being connected to a hardwired network, such as an Ethernet network. Mobile devices may additionally include cameras, and microphones, that enable users to capture and transmit audio and visual data via available networks. Mobile devices may additionally include short range wireless communications capabilities such as Bluetooth® or NFC.

For the purposes of this disclosure, the term "app", "applications", and "application software" are used interchangeably, and should be understood to refer to computer program code in machine readable form, which may be stored on computer-readable media, that is executable by a server, mobile device, or other type of computing device or cluster of computing devices (e.g., such as provided by a cloud platform or service). Such machine readable form may comprise, without limitation, source code in a computer programming language, interpreted source code, or source code compiled into machine language directly executable by a specific processor type.

For the purposes of this disclosure, the term "platform" should be understood to refer a framework on which applications may be run. Such a framework can include various computing devices, such as, for example, servers, mobile devices, and desktop computers, which may be networked with one another. A platform may also be understood to include software applications implementing various functions provided by the platform. In various embodiments, a platform may be implemented, in whole, or part, utilizing an underlying cloud-based platform such as the Google Cloud® platform or the IBM Cloud® platform.

For the purposes of this disclosure a computer-readable medium stores computer data, which data can include computer program code that is executable by a computer, in machine readable form. By way of example, and not limitation, a computer-readable medium may comprise computer-readable storage media, for tangible or fixed storage of data, or communication media for transient interpretation of code-containing signals.

Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory, or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

In various embodiments, the present disclosure is directed to a platform that provides one or more user programmable remote transmitters, designed and programmable/programmed to perform single or multiple operations, optionally incorporated into a custom-made base that attaches to smart phone cases or other devices. Examples of user programmable remote transmitters include but are not limited to key fobs and smart keys having the ability to function as a key and/or controller for one or more objects including but not limited to automobiles, trucks, motorcycles, boats, doors, and other objects. For the purposes of the present disclosure, embodiments of such user programmable remote transmitters will hereinafter be referred to as an Attachable Remote Keys or ARKs.

In an embodiment, the ARK targets automobile keyless entry and ignition systems. In various embodiments the base of the ARK may take the form of a complete phone case into which multiple car remotes could be incorporated. In an embodiment, a keyless home entry system or other remotes could also be included. In an embodiment, a full case could include a sleeve for a driver's license, a credit card, and a home key. In various embodiments, the ARK is capable of incorporating electronic advances to maintain market leadership. Illustrative physical embodiments are shown in FIG. 7-11 (discussed further below).

In an embodiment, there are two distinctive features of the technology: the remote transmitter within the ARK is designed and activated via secured programming without the intervention of car dealers, locksmiths or using difficult manual processes; and, optionally, the case of the ARK can be attached to smart phones, mobile devices, or other suitable surfaces (e.g., a briefcase or a vehicle's dashboard) for safekeeping and accessibility.

In various embodiments, the design of the systems and methods disclosed herein to do away with the need for a customer to travel to a dealer/locksmith for key fob programming and significantly reduce the expense. With ARK technology, anyone purchasing an ARK will be able to easily and securely self-program their keys.

In various embodiments, an ARK comes equipped with the ability to be controlled by the owner's smartphone. In other words, an ARK could be left in the vehicle and the user could access all the key fob's functions directly from their smart phone.

FIG. 1 shows an overview of an embodiment of a 100 system for a user programmable attachable remote key (ARK) 110 in accordance with present disclosure.

The technical components that make up the ARK platform are:

the ARK 110;
the ARK smart phone app (ARK App) on a user mobile device 130;
the ARK ODB2 peripheral 140;
ARK Cloud-Based Services 150.

In an embodiment, the ARK 110 is capable of wirelessly communicating 112 with a vehicle's 120 onboard computer, much as a standard key fob does, and communicating via a short range wireless protocol 114, such as the Bluetooth® protocol, with the user's mobile device 130, for example, a smart phone. In an embodiment, the user's mobile device 130 is further capable of wirelessly communicating with the ARK ODB2 adapter 140 via a short range wireless protocol 134, such as the Bluetooth® protocol, and via a mobile network, with ARK Cloud-Based Services 150.

In an embodiment, the ARK 110 looks, feels and operates just like any traditional vehicle key fob. However, there are two distinctive features of the technology: the remote transmitter of the ARK 110 is designed and activated via secured programming without the intervention of car dealers, locksmiths or difficult processes; and, the case of the ARK can be attached to a smartphone 130 or other mobile device, kept in purses or briefcases, purses, or attached to other suitable surfaces for safekeeping and accessibility.

In an embodiment, in addition to the normal circuitry logic to control the vehicles functions, the ARK is designed with additional technology that allows the communication from the ARK to any smartphone capable of supporting wireless communications, including but not limited to Bluetooth low energy (BTLE or BLE) communications protocol (short-wavelength UHF in the ISM band from 2.4 to 2.485 GHz) and Ultra-Wide Band (UWB) communication protocols. It should be understood that reference to BLE or BTLE hereinafter refers to any wireless communication protocols including UWB.

In an embodiment, initial configuration and setup of the ARK 110 is attained by enabling the device while pressing the configuration button option (similar to the configuration of other Bluetooth accessories for smartphones). Once the ARK enters configuration mode, the user can pair it with their smartphone 130 and proceed with the rest of the ARK 110 setup.

In the BLE communications protocol, the ARK 110 operates as a Bluetooth peripheral device. The smart phone operates as a central device. In an embodiment, ARK devices 110 are factory programmed with a unique key and pre-registered in a database provided by ARK Cloud-Based Services 150 for security and history programmability tracking.

In an embodiment, the ARK does not need a smartphone to be operational; the smart phone 130 and ARK App are used for programing only, replacing the cumbersome In an embodiment, the ARK 110 operates on a coin cell battery. Under normal conditions and with the BLE turned off, the ARK will operate similarly to legacy devices and battery will have the same duration. In an embodiment, with the BLE enabled device, battery power will be limited to approximately 10-12 months.

In an embodiment, the platform includes an ARK App (not explicitly shown) installed on the user device 130. In various embodiments, the ARK App supports Android and iPhone smart phones.

In an embodiment, all users will be required to register with the platform's 100 ARK Cloud-Based Services 150 and create an account. In an embodiment, the registration process provided by the ARK Cloud-Based Services is used in order to track user, datetime, VIN, and ARK 110 programing history. In an embodiment, this will also prevent the unauthorized use of key reprograming or counterfeited products. In an embodiment, user registration with the ARK Cloud-Based Services 150 is also available over a desktop web application.

In an embodiment, in order to provide requisite security, the registrant will need to provide name, address, mobile phone number, the registrant's vehicle's VIN, other security information, and the registrant's credit or debit card. Security will be provided by the consistency of all of these factors.

In an embodiment, once the user's smartphone 130 is paired with the ARK 110, ARK 110 programming is handled thru the ARK App. There will be no need to press any keys/buttons on the ARK. In an embodiment, once the ARK 110 has been successfully programmed and paired with a specific smartphone 130, it cannot be paired to any other device unless it is factory reset by the key owner.

In an embodiment, once the ARK 110 is operational, it can be used as an extension of the ARK App. In other words, all the same functions available on the ARK 110 will be available on the user's smartphone 130. In an embodiment, the ARK App enables the user's smartphone 130 to be able to track the location of their ARK 110 as long as users are within 300 ft of the ARK 110. In an embodiment, the ARK App enables the user's smartphone to measure the current battery life of the ARK 110 so the user can replace the battery before it dies.

In an embodiment, the ARK ODB2 peripheral 140 is a Bluetooth based ODB2 protocol compliant device. It plugs into the vehicle's 120 ODB2 computer port 122. All vehicles since 1996 have this port and they are typically located underneath the dashboard 124 of the vehicle 124.

The ARK ODB2 peripheral 140 is required when there are no other programing methods available from the vehicle's manufacturer or when a new set of keys are needed thus deleting or removing any previous programmed key codes from the vehicle's computer. The ARK ODB2 peripheral 140 however, can provide additional services and ease the configuration process. Once the device 140 is connected to the vehicle's 120 ODB2 port 122, using the ARK App, the user will be prompted to connect their smartphone 130. Once communication is established, the user's smart phone can automatically retrieve vehicle 120 information such as VIN, make and model.

In an embodiment, to configure a new ARK 110 using the ODB2 peripheral 140, the user will go thru the steps described herein, which will communicate to the vehicle's computer via the ARK ODB2 peripheral 140 to erase any old keys the user desires to erase from the user's computer and program the new ARK 110. In an embodiment, ARK ODB2 peripheral 140 can also serve as a vehicle's 120 computer scanner and can also report engine or other error codes to the user's smartphone 130.

In an embodiment, ARK 110 and the ODB2 peripheral 140 both communicate with the vehicle's on-board computer during the programming process. In another embodiment, only the ARK 110 communicates with the vehicle's on-board computer during the programming process.

In an embodiment, all users' transactions during registration and configuration, as well as historical data, are securely stored on the ARK Cloud-Based Services 150. In an embodiment, when a user downloads the ARK App to their smartphone 130 and registers, an account is created for the user with the ARK Cloud-Based Services 150. Once a user configures an ARK 110, it will be tied to the user's account and no one else will be authorized to use the ARK unless its factory reset and reconfigured.

In an embodiment, the procedure for creating a user account and registering an ARK 110 with the cloud-based services 150 is a simple procedure.
  user downloads ARK App;
  the user Creates an account (using email, password) with
    ARK Cloud-Based Services;
  the ARK is placed in configuration mode;
  the user adds the ARK to his/her account with ARK
    Cloud-Based Services In an embodiment, users can retrieve configuration information, history logs, change certain user profile settings from the ARK Cloud-Based Services 150. During configuration, a user is required to have a smartphone 130 or comparable mobile device with data connectivity. Thereafter, to view any transactional history, edit or change a user's profile they can access ARK Cloud-Based Services 150 using any type of device.

In various embodiments, the ARK Cloud-Based Services are easily scalable and as the demand grows so will the ARK Cloud-Based Services. Provisioning of cloud-based services has become a standard in the industry providing fast data access and redundancy no matter the user's location.

In various embodiments, the ARK system 100 is designed to eliminate the need for vehicle owners to either contact a locksmith or visit a dealership to program a new key. It is a product with the intent purpose to remove not only the hassle and time, but to reduce the high costs involved in programing a vehicle's smart key.

Figure 2:
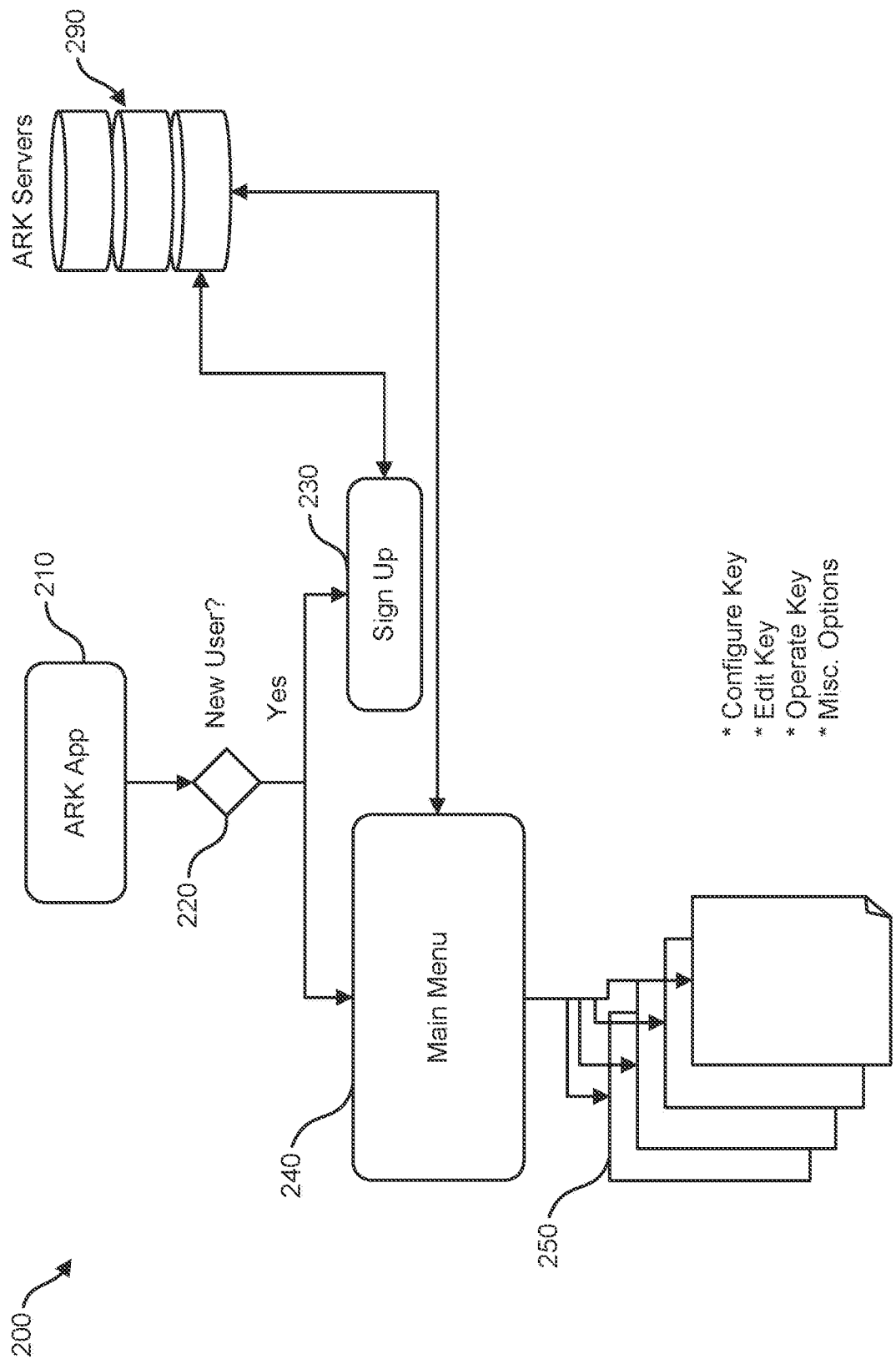
FIG. 2 shows a block diagram providing a high-level view of an embodiment of functions provided by an ARK App in accordance with the present disclosure.

FIG. 2 shows a block diagram providing a high-level view 200 of an embodiment of functions provided by an ARK App 210 in accordance with the present disclosure.

In an embodiment, when the ARK App 210 is first installed on a user's mobile device, a new user 220 is taken to a sign up process 230 whereby the user is registered with ARK servers 290 within the ARK Cloud-Based Services provided by various embodiments of the ARK system of the present disclosure.

Figure 5:
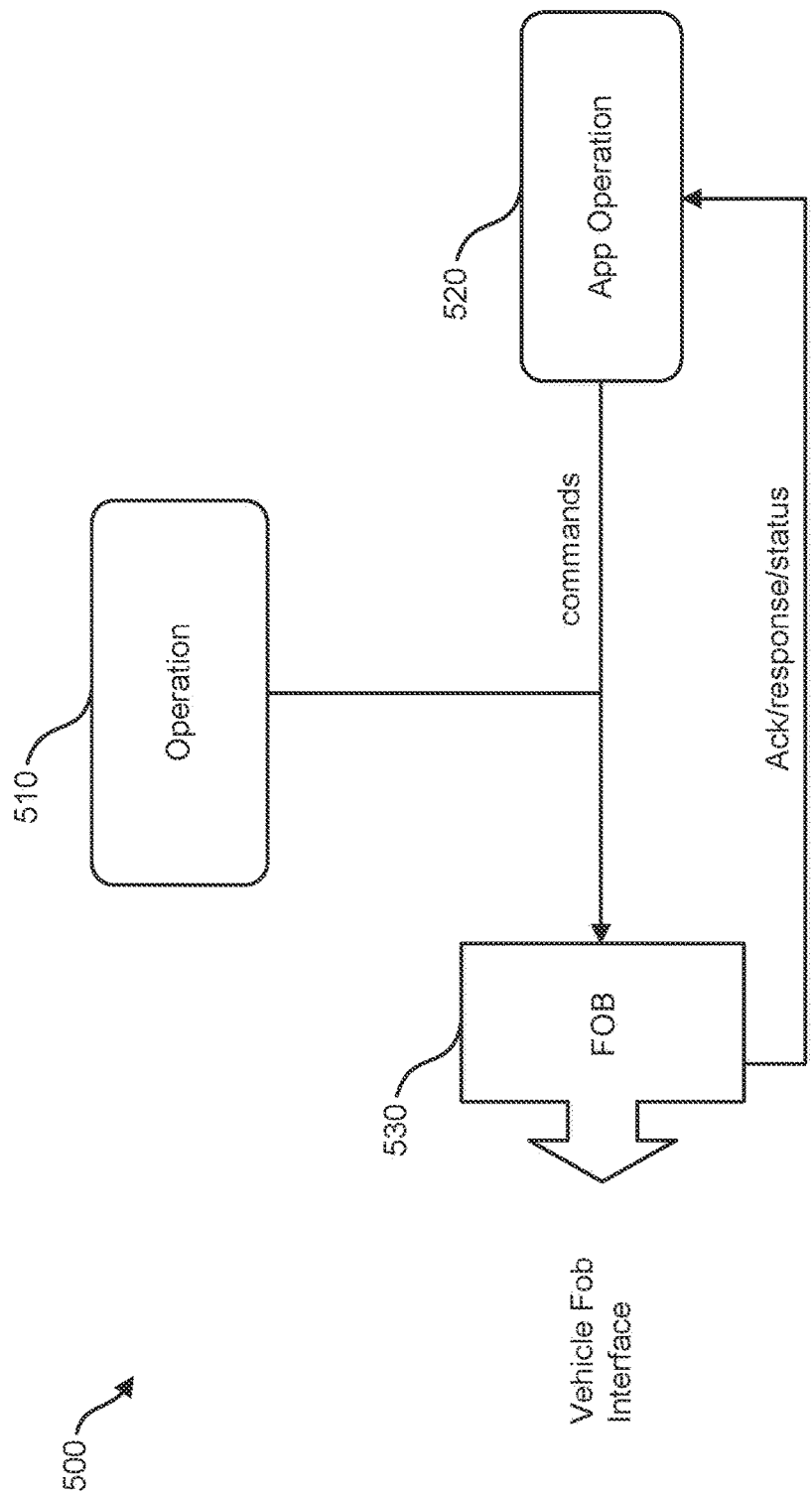
FIG. 5 shows a block diagram of an embodiment of the operation of an ARK App and ARK device in accordance with the present disclosure.
Figure 6:
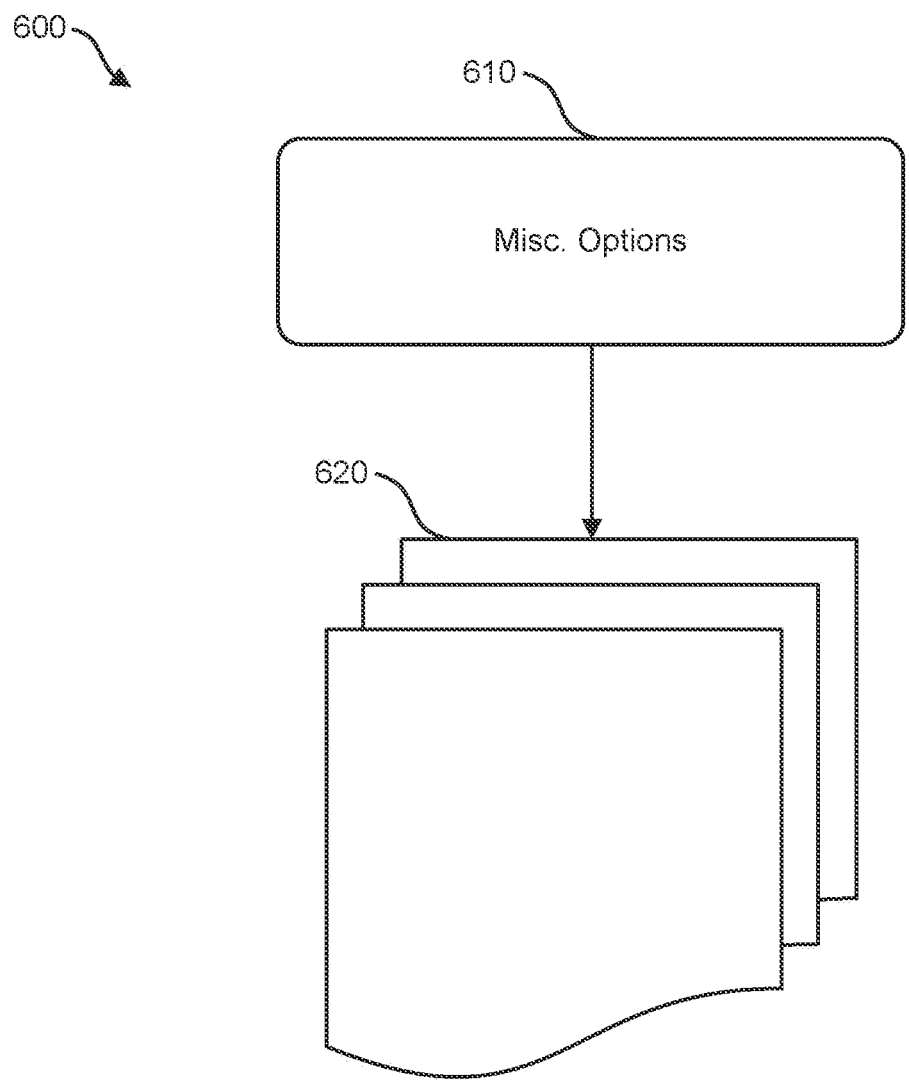
FIG. 6 shows a block diagram of an embodiment of options provided by an ARK App in accordance with the present disclosure.

After registration, the main menu 240 of the ARK App is displayed providing access to various functions 250, including configuration of the ARK (see FIG. 3), changing options on the ARK (see FIG. 4), operation of the ARK (see FIG. 5), and miscellaneous other options (see FIG. 6).

Figure 3:
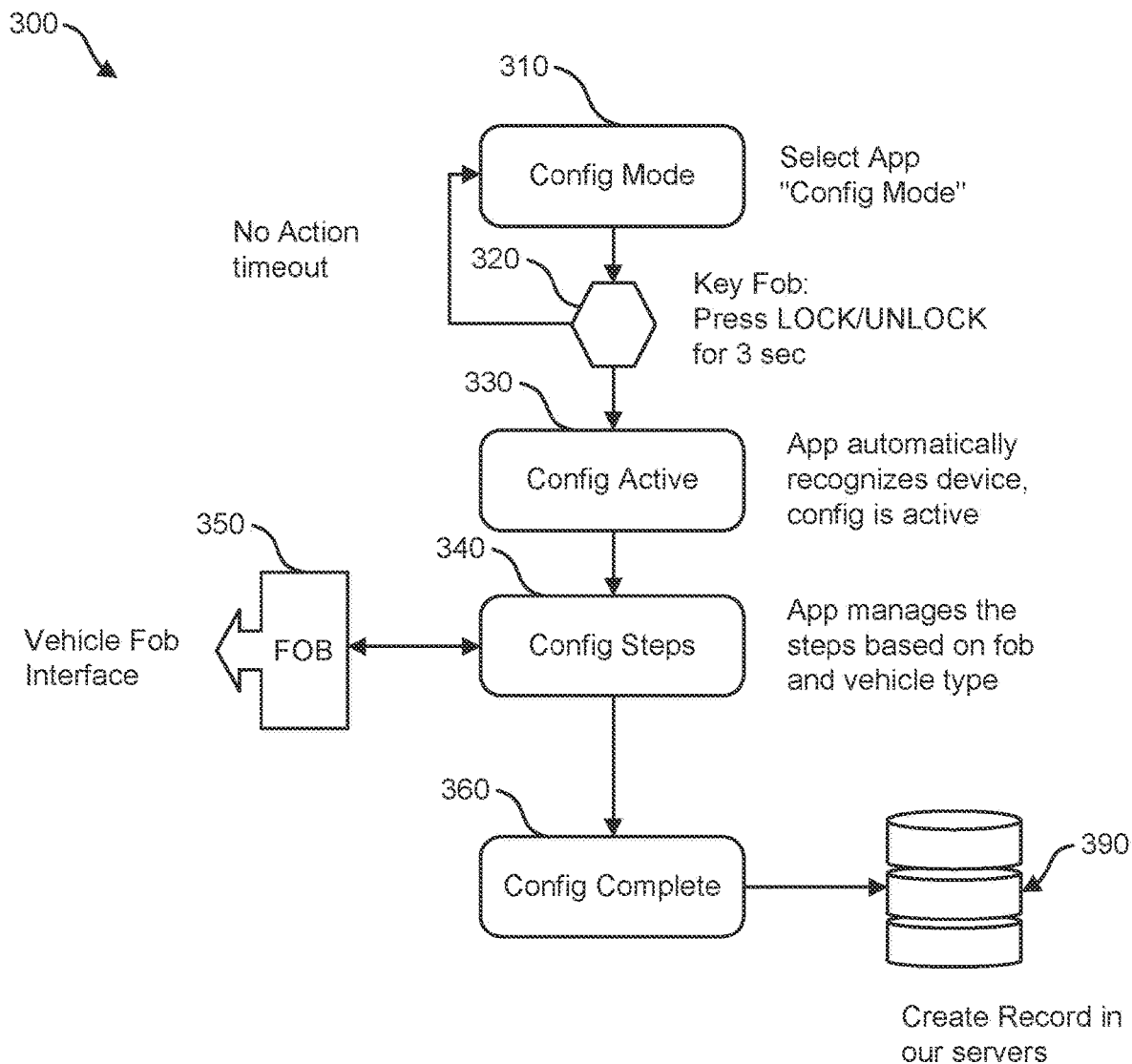
FIG. 3 shows a block diagram of an embodiment of a process of configuring an ARK using an ARK App in accordance with the present disclosure.

FIG. 3 shows a block diagram of an embodiment of a process 310 of configuring an ARK using an ARK App in accordance with the present disclosure.

In an embodiment, to configure an ARK device, configuration mode 310 is selected on the ARK App. In an embodiment, on the ARK device the user presses the lock/unlock button on the device for three seconds to place the device into configuration mode. The ARK App then recognizes that configuration is active 330. The ARK App then executes the appropriate configuration steps 340 to configure the ARK device to program a vehicle's fob interface 350 (within the vehicle's computer) to recognize the ARK. Note that the steps can be quite involved, and can vary based on vehicle type, make, and model. The user however sees the action performed in a single step on the ARK App. When configuration is complete 360, data relating to the configuration is stored on servers 390 within the ARK Cloud-Based Services.

Figure 4:
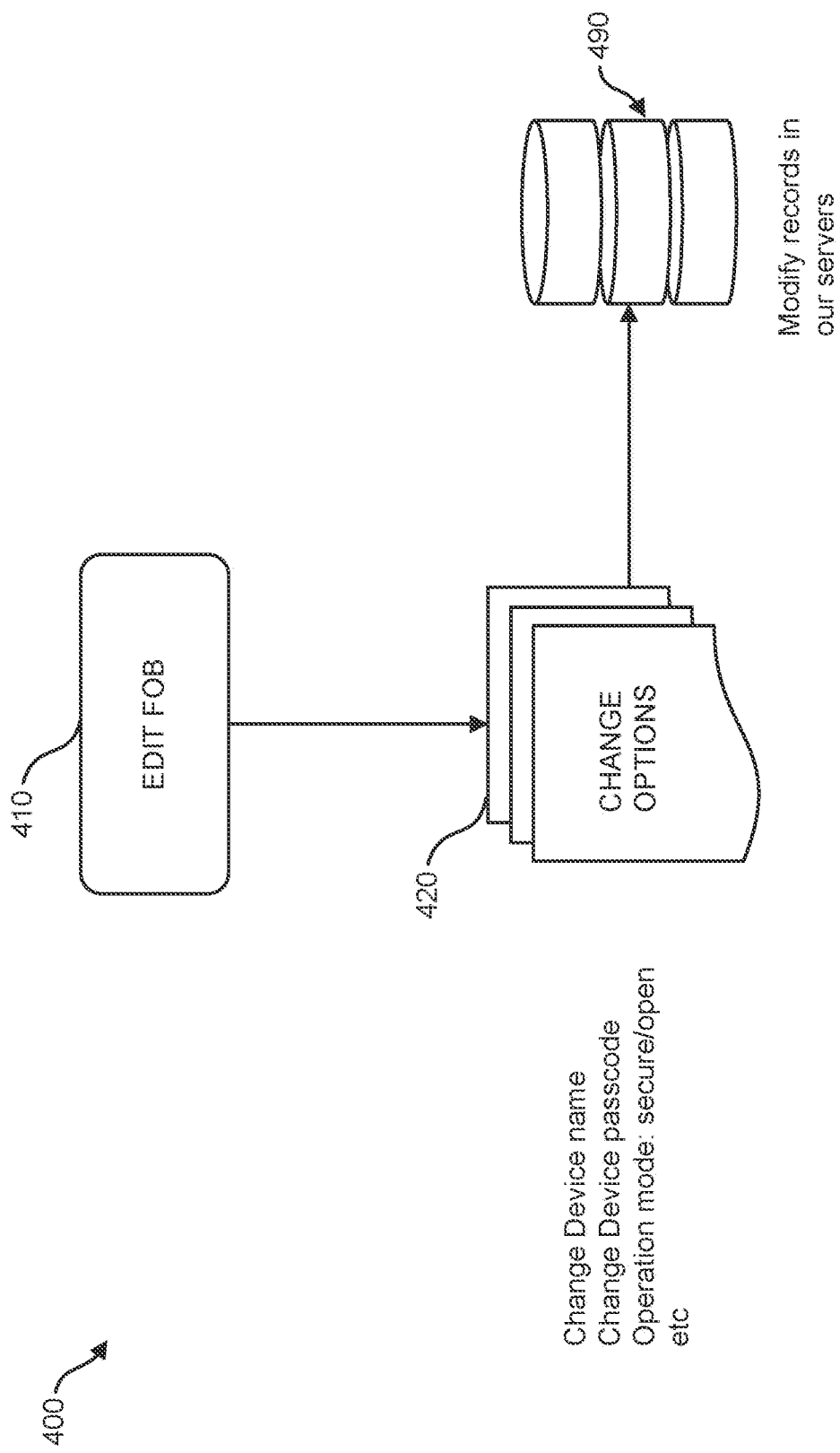
FIG. 4 shows a block diagram of an embodiment of a process of changing options relating to an ARK using an embodiment of ARK App in accordance with the present disclosure.

FIG. 4 shows a block diagram of an embodiment of a process 400 of changing options relating to an ARK using an embodiment of ARK App in accordance with the present disclosure.

In an embodiment, the user using the ARK App selects a function for editing the ARK devices options 410. The user is then able to change various options 420, which in various embodiments includes changing the device name, changing the device passcode, and setting the device's operation mode, which could be secure or open. Other options may be supported. In an embodiment, when device options are changed, such changes are recorded on servers 490 provided by the ARK Cloud-Based Services.

FIG. 5 shows a block diagram of an embodiment 500 of the operation 510 of an ARK App and ARK device in accordance with the present disclosure.

In an embodiment, the ARK App can be used to issue commands 520 to the ARK device 530, which in turn, issue commands to a vehicle's fob interface. In an embodiment, the ARK device in turn communicates back to the ARK App with responses to such commands. Note that commands can originate with the ARK App or the ARK device.

FIG. 6 shows a block diagram of an embodiment 600 of options provided by an ARK App in accordance with the present disclosure.

In embodiment, when the user selects a function on the ARK App to select miscellaneous options 610, the user is able to access various options 620 relating to the ARK device or data stored on ARK Cloud-Based Services relating to the device. In various embodiments, such actions could include changing account settings, viewing device and account history, deactivating the device, as well as any other options in a particular embodiment.

Figure 7:
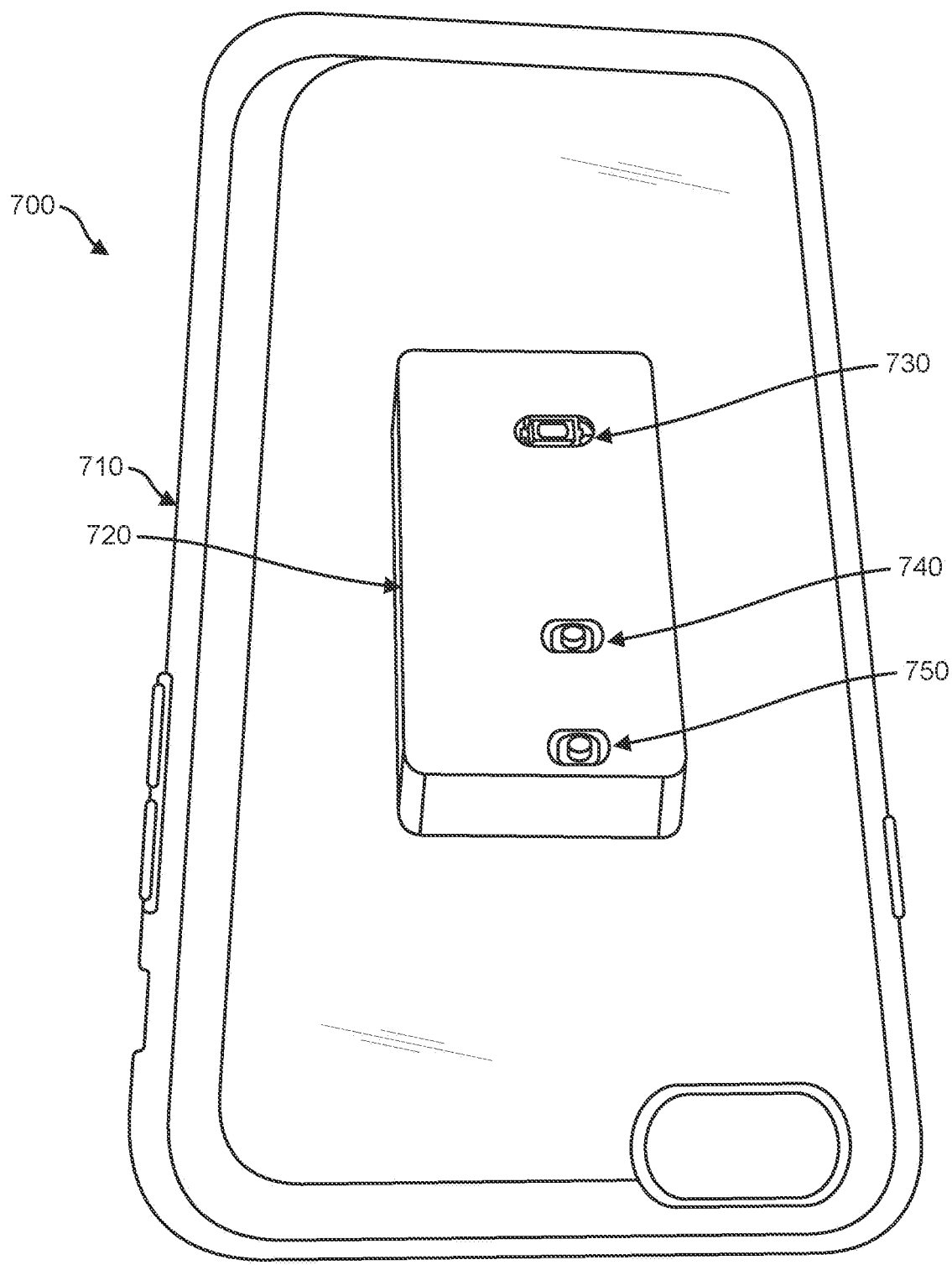
FIG. 7 shows an embodiment of an ARK in accordance with present disclosure attached to a smart phone case.

FIG. 7 shows an embodiment 700 of an ARK 720 in accordance with the present disclosure attached to a smart phone case 710.

In the illustrated embodiment, the housing of the ARK 720 is attached to a conventional smart phone case 710. The housing of the ARK is attached to the smart phone case 710 by its base (not visible) using an adhesive pad (not visible). The housing of the ARK 720 has apertures 730, 740, and 750 for the buttons of a circuit board (not visible), the circuit board implementing functions to remotely lock and unlock the doors of an automobile, and to set off an alarm in the automobile.

Figure 8:
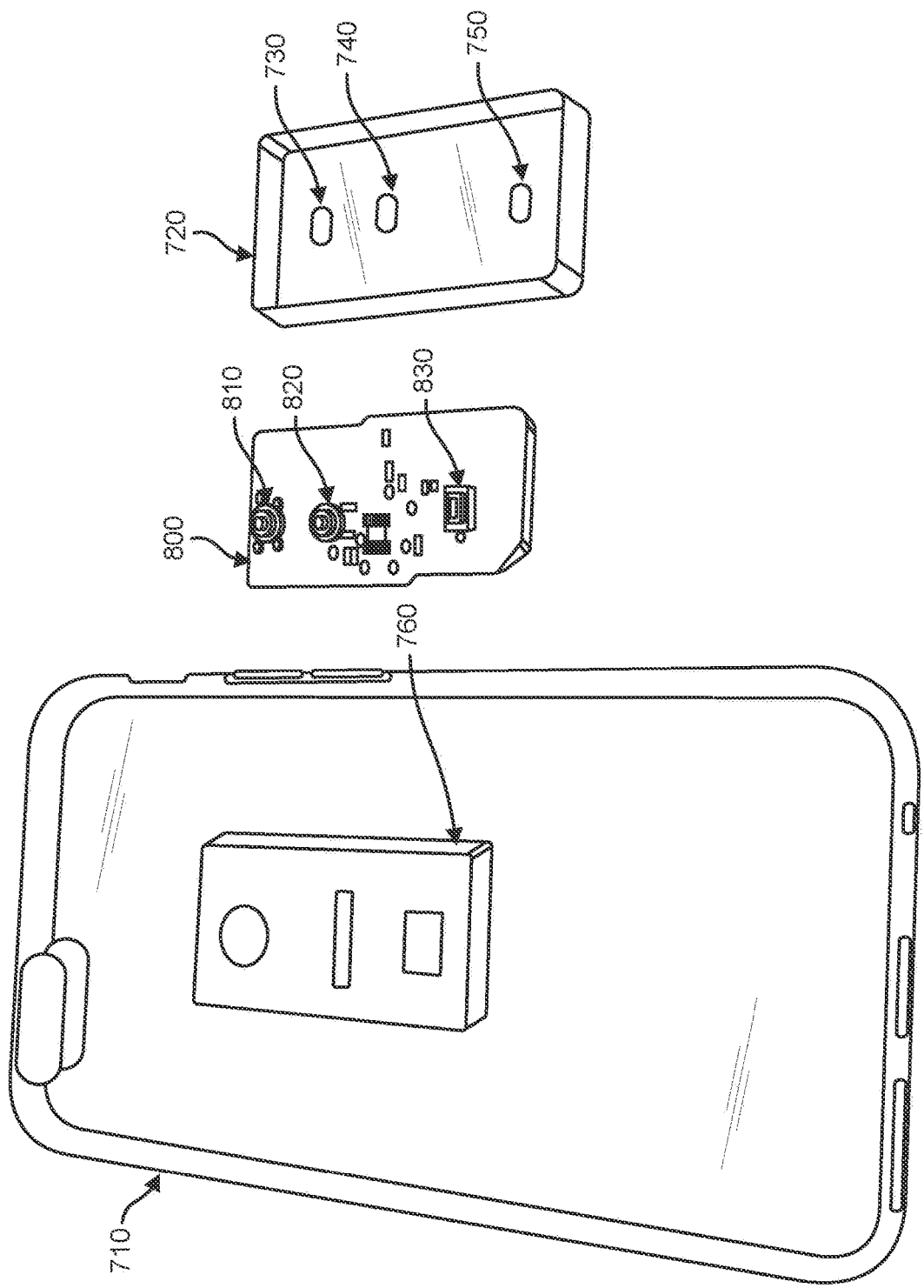
FIG. 8 shows the ARK of FIG. 7 disassembled where the base of the ARK is attached to a smart phone case and the circuit board that implements the functions of the ARK are visible.

FIG. 8 shows the ARK of FIG. 7 disassembled where the base of the ARK 760 is attached to a smart phone case 710 and the circuit board 800 that implements the functions of the ARK are visible.

The top of the housing of the ARK 720 is shown flipped over such that the underside of the housing is visible. The apertures 730, 740, and 750 can be seen as well. In this illustration, the circuit board 800 that implements the functions of the ARK is visible. The circuit board 800 has a button 810 that unlocks an automobile. The button 810 is accessible to a user through the aperture 730. The circuit board 800 further has a button 820 to unlock an automobile. The button 820 is accessible to a user through the aperture 740. The circuit board 800 further has a button 830 to start the automobile. The button 830 is accessible to a user through the aperture 750.

In this illustration, the base of the ARK 760 can be seen. The top of the housing of the ARK 720 snaps onto the base, with the circuit board 800 inside the housing of the ARK 720 such that the buttons 810, 820, and 830 are accessible through the respective apertures 730, 740, and 750 in the housing.

In the illustrative prototype, the base 760 is attached to the smart phone case 710 using an adhesive pad, however any other suitable means of attaching the base 760 to the smart phone case 710 could be used. In this example, the ARK 720 attached to the base provides the functions of unlocking and locking an automobile, starting the automobile, setting an alarm on the automobile, and other functions. Other devices can be attached to this base 760 or integrated fully into a case.

The base 760 can be attached to a wide variety of portable or stationary objects. A smart phone case 710 is one example of a portable object. Other examples of a portable object could be a laptop, a briefcase, or a tablet computer, or even another remote controller, such as a garage door opener. A stationary object could be a desk, a door, a wall, or a desktop computer.

In the illustrated embodiment, the circuit board 800 provides short range radio transmission capabilities to transmit coded signals to a receiver in the automobile which the ARK 720 is used to control (e.g., 315 MHz). In various embodiments, entry codes are encrypted and rotated to enhance security.

Depending on the capabilities of the circuit board 800, the ARK may have the capability to communicate with the device it is attached to and control functions on that device, or alternatively, be controlled by software, for example, a mobile app, on the device. Depending on the capabilities of the circuit board 800, communication may be via Wi-Fi, Bluetooth®, or near field communication.

In various other embodiments, the circuit board 800 could implement a user programmable computer to which a user could download software applications. For example, the circuit board 800 could implement an Android device. For example, in various other embodiments the ARK and the circuit board 800 could provide multiple buttons that are programmable, similar to a universal remote.

In the illustrated embodiment, the circuit board 800 provides click type buttons (e.g., have to be clicked using a pen) that provide the advantage that they are not easily pressed in the user's pocket. In various other embodiments, the buttons may take any suitable form now known or later to be developed in the art. In various other embodiments, the buttons of the ARK 720 could be in different colors for easy memorization of the functions provided by the buttons.

Figure 9:
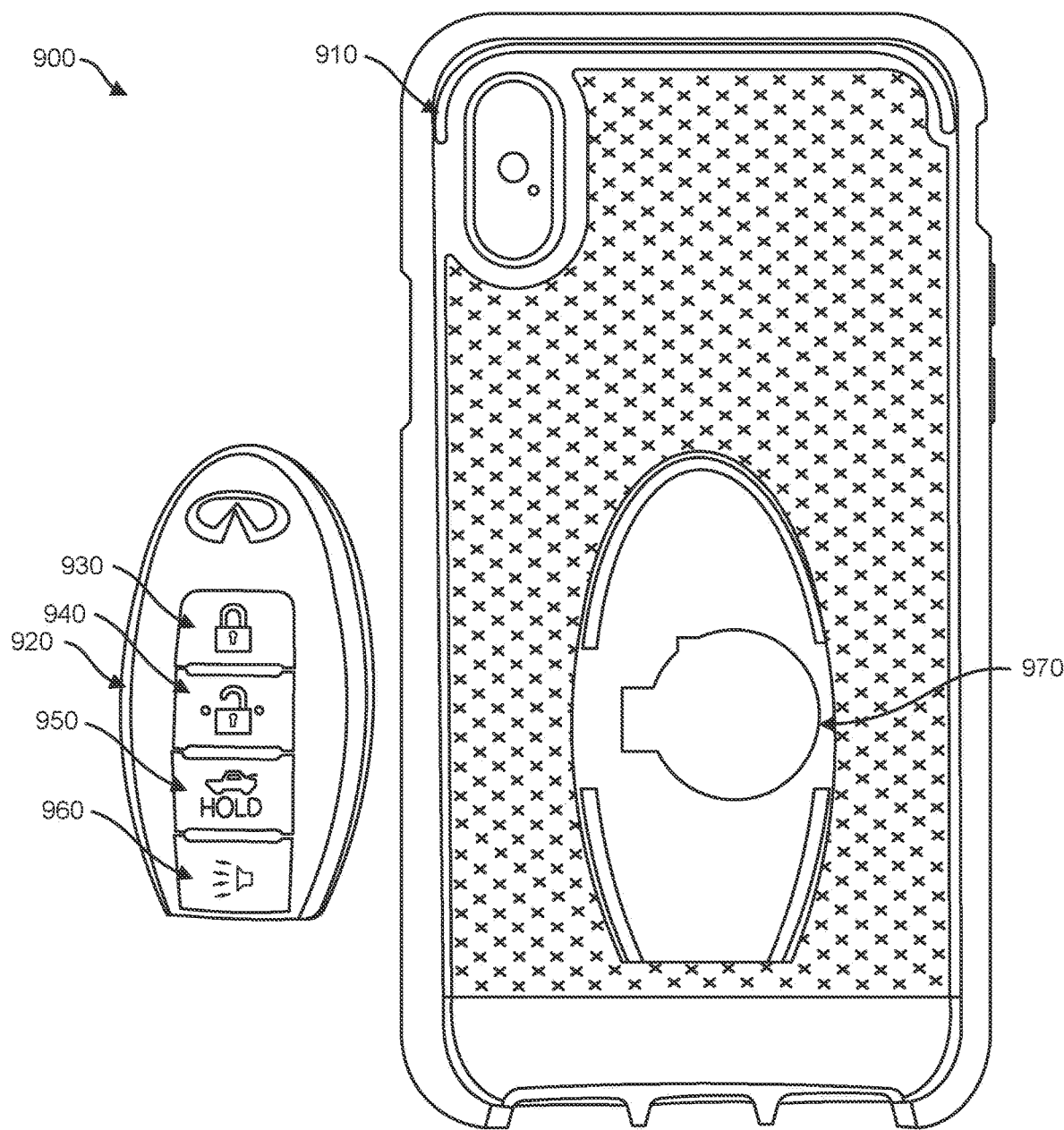
FIG. 9 shows another embodiment of an ARK in accordance with present disclosure attached to a smart phone case.

FIG. 9 shows another embodiment 900 of an ARK in accordance with present disclosure attached to a smart phone case 910.

In the illustrated embodiment, the base 970 of the ARK is attached to a conventional smart phone case 910 using an adhesive pad (not visible). The housing of the ARK 920 has buttons 930 (lock button), 940 (unlock button), 950 (open trunk button), and 960 (alarm button) that overlay switches on a circuit board (not shown), the circuit board implementing functions to remotely lock, and unlock the doors of an automobile, open the automobile's trunk, and to set off an alarm in the automobile.

Figure 10:
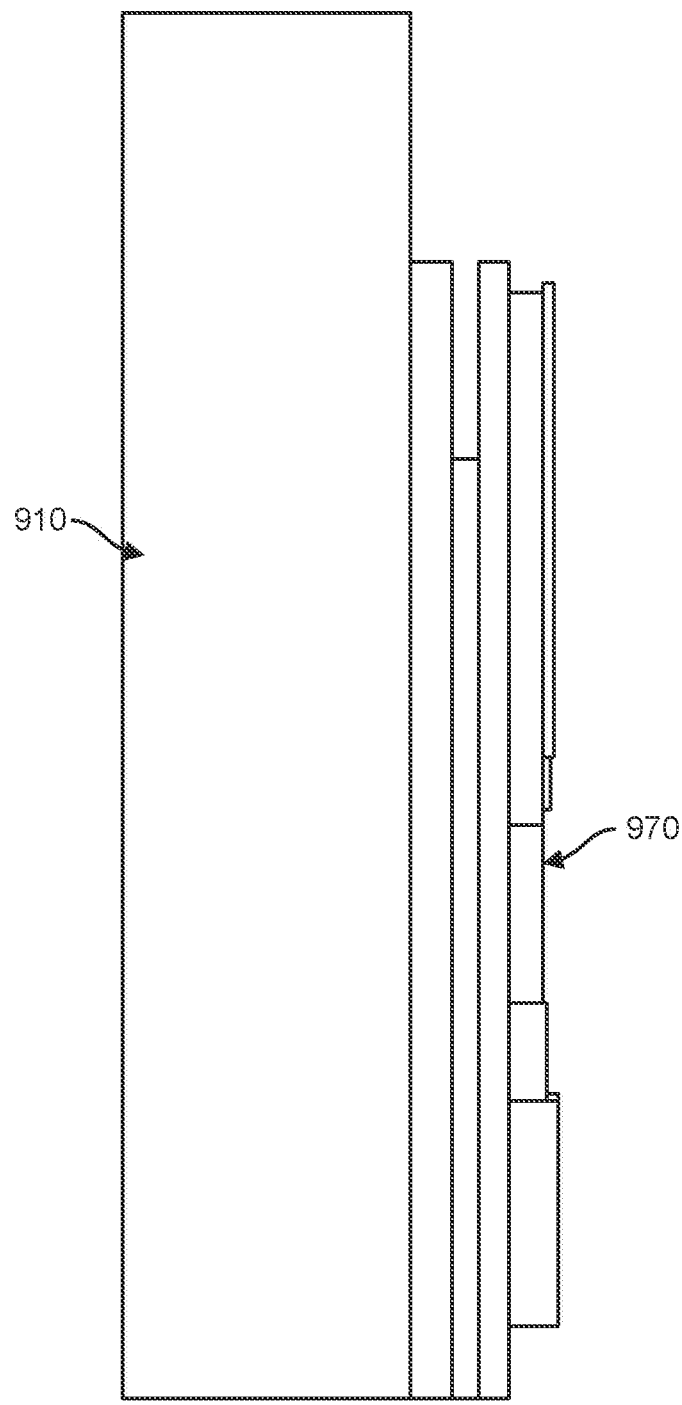
FIG. 10 shows the base of the ARK of FIG. 9 from a side view attached to a smart phone case.

FIG. 10 shows the base of the ARK of FIG. 9 from a side view attached to a smart phone case.

In the illustrative prototype, the base 970 is attached to the smart phone case 910 using an adhesive pad (not shown, however any other suitable means of attaching the base 970 to the smart phone case 910 could be used.) In this example, the ARK attached to the base provides the functions of unlocking and locking an automobile, starting the automobile, opening the truck of the automobile, and setting an alarm on the automobile. Other devices can be attached to this base 970 or integrated fully into a case 910 that acts as the ARK itself.

Figure 11:
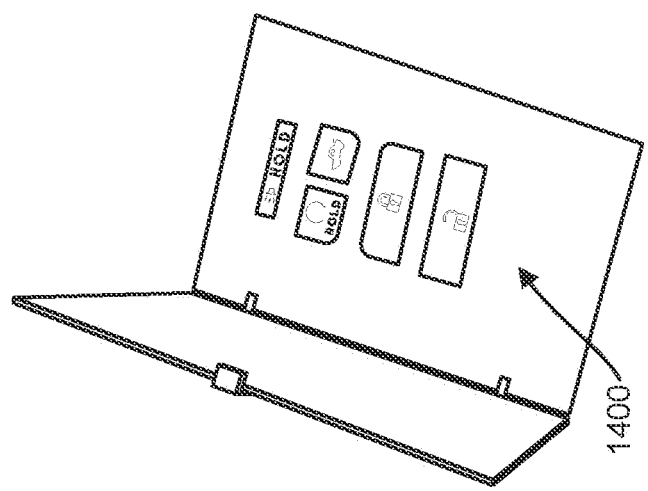
FIG. 11 shows various illustrative form factors that can be used for an ARK in accordance with the present disclosure.
Figure 11:
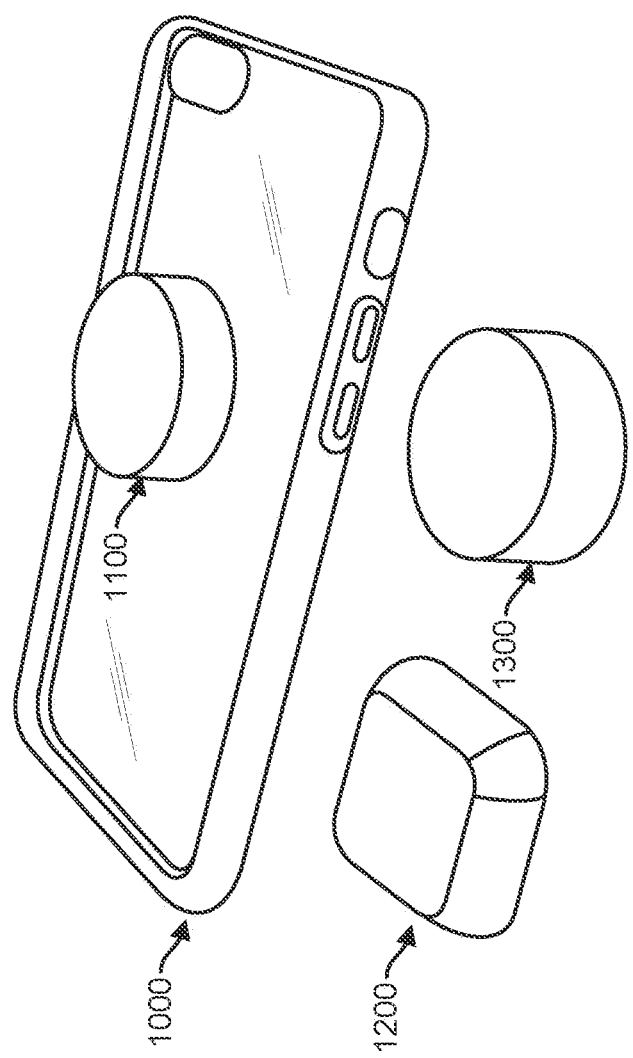

FIG. 11 shows various illustrative form factors 1100, 1200, and 1300 that can be used for an ARK in accordance with the present disclosure.

The illustration shows a black cylindrical form factor 1100, a white cylindrical form factor 1300, and white square form factor 1200, all of which could be attached to a smart phone case 1000 using any suitable means. In the illustrated embodiments, the ARK form factors 1100, 1200, and 1300 are fabricated using a hard plastic. The illustration also shows a flat passport/wallet form 1400 not attached to a smart phone case 1000; this flat form is suitable for attachment to a smartphone or other device where a streamlined form is desirable. The plastic could be any color beyond the colors illustrated herein. The various devices and form factors 1100, 1200, 1300, and 1400 could be fabricated using any suitable material, for example, silicone, metal, or an impact and water resistant hard plastic.

In an embodiment, an internal transmitter within the controller can be programmed by the user to different radio frequencies for various uses. In an embodiment, the buttons on the attachment correspond to these different programmed radio frequencies. In an embodiment, with respect to a controller for remote keyless system for an automobile, the controller has four buttons: lock, unlock, trunk and alarm, much like a standard key fob. In various embodiments, this can vary as needed.

In an embodiment, the internal transmitter is able to learn appropriate radio frequencies and signals for controlling various devices in a way similar to how conventional garage door openers learn the signal for a garage door, and thus the controller can be programmed to be used as a remote control in various capacities.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A platform for programming one or more new vehicle fobs, comprising:
   each of the one or more new vehicle fobs adapted to:
     wirelessly transmit commands to an onboard computer of a vehicle once an onboard computer's fob interface has been reprogrammed; and
     communicate with a user's computing device;
   at least one remote server hosting a service adapted to communicate with the user's computing device, the service adapted to:
     receive vehicle information;
     transmit programming instructions to the user's computing device for reprogramming the onboard computer's fob interface to recognize the one or more new vehicle fobs;
   an application comprising computer executable instructions that when installed on the user's computing device, enables the user's computing device to:
     receive the vehicle information;
     receive the programming instructions for reprogramming the onboard computer's fob interface to recognize the one or more new vehicle fobs; and
     transmit the programming instructions to the new vehicle fob and to the onboard computer's fob interface of the vehicle such that the onboard computer's fob interface is reprogrammed to recognize the one or more new vehicle fobs and respond to the commands from the one or more new vehicle fobs.

2. The platform of claim 1, wherein the commands from the one or more new vehicle fobs comprise at least one command configured to open the vehicle, lock the vehicle, start the vehicle, and open a trunk of the vehicle.

3. The platform of claim 2, wherein the application further enables the user's computing device to cause the one or more new vehicle fobs to transmit at least one of the commands to the onboard computer of the vehicle using a graphic user interface provided by the application on the user's computing device.

4. The platform of claim 1, wherein the user's computing device is configured to wirelessly connect to a wireless interface of the vehicle and automatically retrieve a make and model of the vehicle.

5. The platform of claim 1, wherein the application further enables the user's computing device to retrieve and display a location of the one or more new vehicle fobs on a graphic user interface on the user's computing device.

6. The platform of claim 1, wherein the one or more new vehicle fobs have at least one button that, when pressed, causes the new vehicle fob to transmit one of the commands to the onboard computer of the vehicle.

7. The platform of claim 1, wherein user's computing device is further adapted to instruct the vehicle fob interface to delete any pre-existing key fobs from the onboard computer of the vehicle.

8. The platform of claim 1, wherein the application includes further instructions for receiving user information from the user and transmitting the user information to the service.

9. The platform of claim 1, wherein the one or more new vehicle fobs include an internal transmitter configured to learn multiple distinct radio frequencies for controlling multiple devices.

10. A method for programming one or more new vehicle fobs, comprising:
   receiving the one or more new vehicle fobs, wherein the one or more new vehicle fobs is adapted to:
      wirelessly transmit commands to an onboard computer of a vehicle once an onboard computer's fob interface has been reprogrammed; and
      communicate with a user's computing device;
   transmitting, from the user's computing device to at least one remote server, d vehicle identification information;
   in response to receiving vehicle identification information, transmitting to the user's computing device programming instructions for reprogramming the onboard computer's fob interface to recognize the one or more new vehicle fobs; and
   transmitting the programming instructions to the one or more new vehicle fobs and to the onboard computer's fob interface of the vehicle such that the onboard computer's fob interface is reprogrammed to recognize the one or more new vehicle fobs and respond to the commands from the one or more new vehicle fobs.

11. The method of claim 10, wherein the commands from the one or more new vehicle fobs comprise at least one command configured to open the vehicle, lock the vehicle, start the vehicle, and open a trunk of the vehicle.

12. The method of claim 11, wherein the user's computing device is configured to transmit at least one of the commands to the onboard computer of the vehicle using a graphic user interface provided by the application on the user's computing device.

13. The method of claim 10, further including the user's computing device wirelessly connecting to a wireless interface of the vehicle and automatically retrieving a make and model of the vehicle.

14. The method of claim 10, wherein the user's computing device is configured to retrieve and display a location of the one or more new vehicle fobs on a graphic user interface on the user's computing device.

15. The method of claim 10, further including:
   transmitting to the user's computing device programming instructions for deleting any pre-existing key fobs from the onboard computer of the vehicle; and
   deleting any pre-existing key fobs from the onboard computer of the vehicle.

16. The method of claim 10, wherein the one or more new vehicle fobs include an internal transmitter configured to learn multiple distinct radio frequencies for controlling multiple devices.

17. A platform for programming a new vehicle fob, comprising:
   the new vehicle fob adapted to:
      wirelessly transmit commands to an onboard computer of a vehicle once an onboard computer's fob interface has been reprogrammed; and
      communicate with a user's computing device;
   at least one remote server hosting a service adapted to communicate with the user's computing device, the service adapted to:
      receive vehicle identification information;
      transmit programming instructions to the user's computing device for reprogramming the onboard computer's fob interface to recognize the new vehicle fob;
   an application comprising computer executable instructions that when installed on the user's computing device, enables the user's computing device to:
      transmit the vehicle identification information to the service;
      receive the programming instructions for reprogramming the onboard computer's fob interface to recognize the new vehicle fob; and
      transmit the programming instructions to the new vehicle fob and to the onboard computer's fob interface of the vehicle such that the onboard computer's fob interface is reprogrammed to recognize the new vehicle fob and respond to the commands from the new vehicle fob.

18. The platform of claim 17, wherein the commands from the new vehicle fob comprise at least one of, but not limited to open the vehicle, lock the vehicle, start the vehicle, and open a trunk of the vehicle.

19. The platform of claim 17, further including:
   the service adapted to transmit to the user's computing device programming instructions for deleting any pre-existing key fobs from the onboard computer of the vehicle; and
   the user's computing device adapted to receive the programming instructions for deleting any pre-existing key fobs from the onboard computer of the vehicle.

20. The platform of claim 17, wherein the new vehicle fob includes an internal transmitter configured to learn multiple distinct radio frequencies for controlling multiple devices.

* * * * *